(12) United States Patent
Matsuo

(10) Patent No.: US 8,605,040 B2
(45) Date of Patent: Dec. 10, 2013

(54) INPUT DEVICE AND DISPLAY DEVICE WITH INPUT FUNCTION

(75) Inventor: Mutsumi Matsuo, Azumino (JP)

(73) Assignee: Japan Display West, Inc., Aichi-ken (JP)

( * ) Notice: Subject to any disclaimer, the term of this patent is extended or adjusted under 35 U.S.C. 154(b) by 855 days.

(21) Appl. No.: 12/414,726

(22) Filed: Mar. 31, 2009

(65) Prior Publication Data

US 2009/0315843 A1    Dec. 24, 2009

(30) Foreign Application Priority Data

Jun. 24, 2008    (JP) ................ 2008-164117

(51) Int. Cl.
- G06F 3/041 (2006.01)
- G06F 3/045 (2006.01)
- G06K 11/06 (2006.01)
- G08C 21/00 (2006.01)

(52) U.S. Cl.
USPC ..... 345/173; 345/174; 178/18.01; 178/18.03; 178/18.05; 178/20.01

(58) Field of Classification Search
USPC ......... 345/173, 174; 178/18.01, 18.03, 18.05, 178/20.01–20.04
See application file for complete search history.

(56) References Cited

U.S. PATENT DOCUMENTS

| | | | |
|---|---|---|---|
| 6,445,426 B1 | 9/2002 | Kang et al. | |
| 8,144,301 B2 * | 3/2012 | Fujikawa et al. | 349/156 |
| 2005/0019203 A1 * | 1/2005 | Saitoh et al. | 420/506 |
| 2008/0309633 A1 * | 12/2008 | Hotelling et al. | 345/173 |

FOREIGN PATENT DOCUMENTS

| | | |
|---|---|---|
| JP | 62-190524 | 8/1987 |
| JP | 05-341901 | 12/1993 |
| JP | 2001-034419 | 2/2001 |
| JP | 2001034419 A * | 2/2001 |
| JP | 2007-249260 | 9/2007 |

* cited by examiner

*Primary Examiner* — Bipin Shalwala
*Assistant Examiner* — Ilana Spar
(74) *Attorney, Agent, or Firm* — K&L Gates LLP

(57) ABSTRACT

Provided is a resistance film type input device including: a first light transmission substrate and a second light transmission substrate which face each other; a first light transmission planar electrode formed on the surface of the first light transmission substrate, which faces the second light transmission substrate, in an input region, and first band-shaped electrodes having a sheet resistance value lower than that of the first planar electrode and electrically connected along both ends which face each other in a first direction of the first planar electrode; and a second light transmission planar electrode formed on the surface of the second light transmission substrate, which faces the first light transmission substrate, in the input region, and second band-shaped electrodes having a sheet resistance value lower than that of the second planar electrode and electrically connected along both ends which face each other in a second direction perpendicular to the first direction of the second planar electrode, wherein a plurality of openings is formed in at least one of the first planar electrode and the second planar electrode, and wherein island patterns formed of the same light transmission conductive film as the planar electrodes are formed at the inside of the openings.

8 Claims, 6 Drawing Sheets

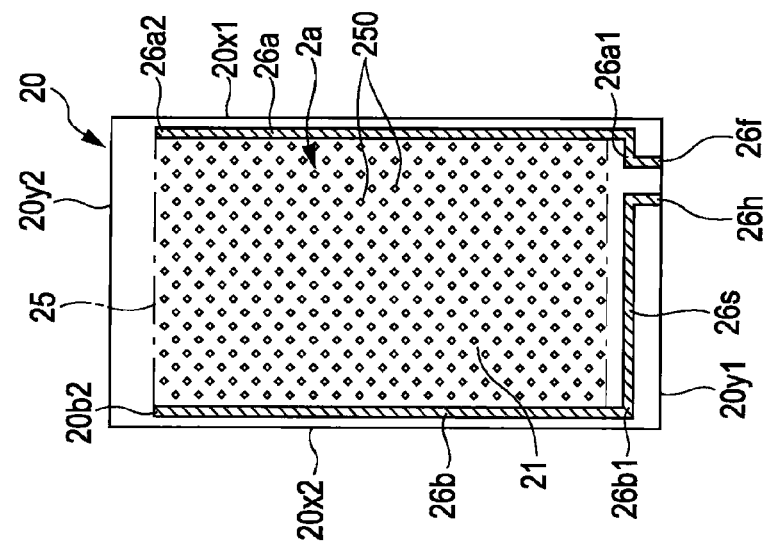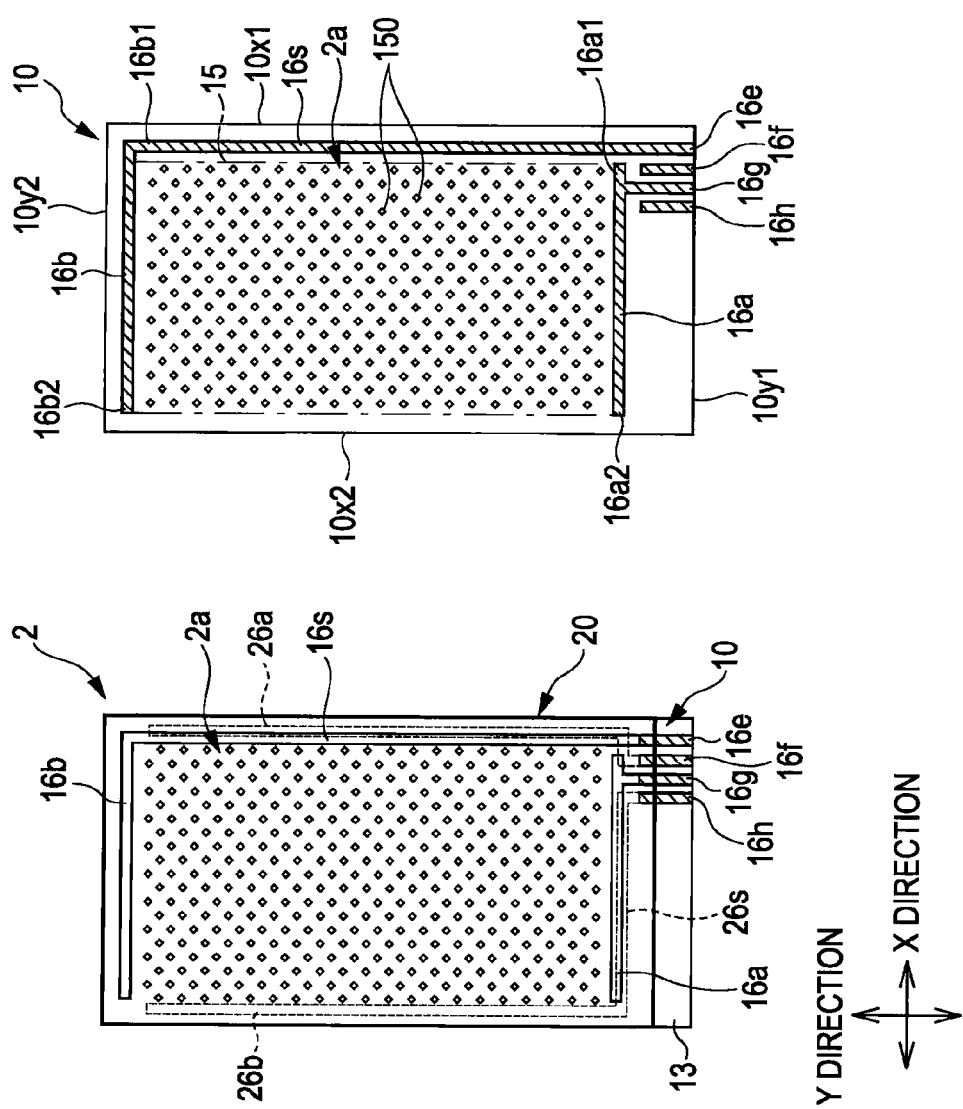

INPUT DEVICE AND DISPLAY DEVICE WITH INPUT FUNCTION

The entire disclosure of Japanese Patent Application No. 2008-164117, filed Jun. 24, 2008 is expressly incorporated by reference herein.

BACKGROUND

1. Technical Field

The present invention relates to a resistance film type input device capable of detecting a touch position of a finger or the like and a display device with an input function, which includes the resistance film type input device.

2. Related Art

In electronic apparatuses such as mobile telephones, car navigation systems, personal computers, ticket vending machines, bank terminals or the like, recently, there is provided an electronic apparatus in which an input device called a touch panel is provided on the surface of a liquid crystal device or the like such that information can be input by referring to an image displayed in an image display region of the liquid crystal device. Among input devices, in a resistance film type input device, planar electrodes are formed over whole input regions of a first light transmission substrate and a second light transmission substrate which face each other, and band-shaped electrodes are electrically connected to the ends of such planar electrodes.

In such a resistance film type input device, a voltage is applied to a planar electrode via a band-shaped electrode so as to detect a contact position. Accordingly, if a sufficient resistance difference is not generated between the resistance value of the planar electrode and the resistance value of the band-shaped electrode, linearity of a position and an electrical signal which can be obtained by an input position detecting circuit deteriorates. However, recently, a region called a frame at the outer circumference of the input region tends to be narrowed and thus the width of the band-shaped electrode needs to be narrowed. Accordingly, the sufficient resistance difference cannot be ensured between the resistance value of the planar electrode and the resistance value of the band-shaped electrode. If the thickness of the planar electrode is reduced, a variation in in-plane resistance is increased, and the planar electrode is damaged while an input operation is repeated, such that the detection of the input position cannot be accurately performed. Thus, reliability deteriorates.

Accordingly, a configuration in which a plurality of openings with 70 μm square is formed in a planar electrode such that a sheet resistance value of the planar electrode is increased by about 2.4 times to 2.5 times is suggested (see JP-A-2001-34419).

However, as described in JP-A-2001-34419, if the openings with 70 μm square are formed, the openings are conspicuous when the resistance film type input device is viewed from the top and the quality of the input device deteriorates. In particular, if an image generating device is arranged on a rear surface of the resistance film type input device so as to configure a display device with an input function, when the openings are conspicuous, an image generated by the image generating device cannot be viewed in a high quality state. In addition, since such a problem becomes more serious if the size of the openings is increased in order to further increase the sheet resistance value of the planar electrode, it is difficult to further increase the sheet resistance value of the planar electrode.

SUMMARY

An advantage of some aspects of the invention is that it provides a resistance film type input device in which openings are inconspicuous even when the openings are formed in a planar electrode so as to increase a sheet resistance value, and a display device with an input function, which includes such a resistance film type input device.

According to an aspect of the invention, there is provided a resistance film type input device including: a first light transmission substrate and a second light transmission substrate which face each other; a first light transmission planar electrode formed on the surface of the first light transmission substrate, which faces the second light transmission substrate, in an input region, and first band-shaped electrodes having a sheet resistance value lower than that of the first planar electrode and electrically connected along both ends which face each other in a first direction of the first planar electrode; and a second light transmission planar electrode formed on the surface of the second light transmission substrate, which faces the first light transmission substrate, in the input region, and second band-shaped electrodes having a sheet resistance value lower than that of the second planar electrode and electrically connected along both ends which face each other in a second direction perpendicular to the first direction of the second planar electrode; wherein a plurality of openings is formed in at least one of the first planar electrode and the second planar electrode, and wherein island patterns formed of the same light transmission conductive film as the planar electrodes are formed at the inside of the openings.

In the invention, since the openings are formed in the planar electrodes, it is possible to increase the sheet resistance values of the planar electrodes. Accordingly, since a sufficient resistance difference between the resistance value of the planar electrodes and the resistance value of the band-shaped electrodes can be ensured, linearity between an electrical signal which can be obtained by an input position detecting circuit and a position can be improved. In addition, since the island patterns having the same refractive index as the planar electrodes are formed in the planar electrodes at the inside of the openings, the existence of the openings is inconspicuous. Accordingly, the quality of the input device is high. When the image generating device is arranged on the rear surface of the resistance film type input device so as to configure the display device with the input function, the existence of the openings is inconspicuous and thus an image generated by the image generating device can be viewed with high quality. In addition, even when the island patterns are completely isolated from the band-shaped electrodes at the inside of the openings or are partially linked at the inside of the openings, since the island patterns are separated from the inner circumferences of the openings with the gap interposed therebetween, the resistance values of the planar electrodes are not reduced. In addition, even when the openings are enlarged for the purpose of further increasing the sheet resistance values of the planar electrodes, the existence of the openings is inconspicuous.

In the invention, the island patterns may be formed by the same light transmission conductive film as the planar electrodes so as to be separated from the inner circumferences of the openings with a gap interposed therebetween. By this configuration, it is possible to form the island patterns having the same refractive index as the planar electrodes without adding a new process.

In the invention, the openings and the island patterns may be formed in at least a planar electrode, which is arranged at an input operation side, of the first planar electrode and the second planar electrode. In the resistance film type input device, when an input operation is performed, the planar electrode arranged at the input operation side is flexed and the planar electrode is apt to be damaged. However, when the openings are formed, since the planar electrode is apt to be flexed, it is possible to prevent the planar electrode from being damaged.

In the invention, the openings and the island patterns may be formed in both the first planar electrode and the second planar electrode. By this configuration, it is possible to increase the sheet resistance of both the first planar electrode and the second planar electrode.

In this case, the formation positions of the openings of the first planar electrode and the second planar electrode may overlap with each other in plan view. The formation position of the openings cannot be used for the detection of the input position even when the openings are formed at any side of the first planar electrode and the second planar electrode, the openings formed in the first planar electrode and the openings formed in the second planar electrode overlap with each other in plan view, the area of the portions which cannot be used for the detection of the input position by the existence of the openings can be decreased. Therefore, the sensitivity of the input device can be increased.

When the invention is applied to the case where an insulating substrate, in which the openings and the island patterns are formed, of the first light transmission substrate and the second light transmission substrate is an alkali glass substrate, it is possible to prevent spots from being generated. That is, when an exposed portion of the alkali glass substrate is large, spots are apt to be generated due to soaking of a sodium component. However, in the present embodiment, since the island patterns are formed at the inside of the openings, the exposed portion of the alkali glass substrate is small. Therefore, it is possible to prevent spots from being generated due to soaking of the sodium component from the alkali glass substrate and make the spots inconspicuous even when the spot are generated.

In the invention, the size of the openings may be 50 μm to 200 μm. By the openings having such a size, it is possible to effectively increase the resistance values of the planar electrodes.

Here, the size of the openings is preferably larger than that of the island patterns, and a ratio of the size of the openings to the size of the island patterns is preferably 2:1 or more or 3:1 or more.

In the invention, the width of the gap may be 5 μm to 30 μm. By such gap width, the existence of the gap is inconspicuous. If the width of the gap exceeds 30 μm, the existence of the gap is conspicuous according to other conditions. Therefore, the width of the gap is preferably 30 μm or less. If the width of the gap is less than 5 μm, when an image generating device such as a liquid crystal device is arranged on the rear surface of the resistance film type input device, the pixel pitch of the liquid crystal device and the width of the gap become close to each other, and, as a result, interference fringes may unpreferably occur although the existence of the gap is inconspicuous. In addition, an unintended short-circuit occurs between the island patterns and the openings and the possibility that the resistance value is changed in a partial region of the first planar electrode or the second planar electrode is unpreferably increased. Accordingly, the width of the gap is preferably 5 μm or more and particularly 10 μm or more.

In the invention, a spacer may be arranged between the first light transmission substrate and the second light transmission substrate, and the spacer may be arranged at a position which overlaps with the openings in plan view or may be arranged at the inside of the openings. The formation positions of the openings and the arrangement position of the spacer cannot be used for the detection of the input position, but, when the openings and the spacer overlap with each other in plan view, the region which cannot be used for the detection of the input position can be decreased.

The resistance film type input device according to the invention can be used in a display device with an input function. In this case, an image generating device is arranged so as to be overlapped on the first light transmission substrate at a side opposite to the second light transmission substrate.

The display device with the input function according to the invention is used in an electronic apparatus such as a mobile telephone, a car navigation system, a personal computer, a ticket vending machine, or a bank terminal.

BRIEF DESCRIPTION OF THE DRAWINGS

The invention will be described with reference to the accompanying drawings, wherein like numbers reference like elements.

FIGS. 2A, 2B and 2C are an explanation view schematically showing the planar layout of an electrode formed on a resistance film type input panel of an input device according to Embodiment 1 of the invention, an explanation view schematically showing the planar configuration of an electrode formed on a first light transmission substrate of this resistance film type input panel, and an explanation view schematically showing the planar configuration of an electrode formed on a second light transmission substrate of the resistance film type input panel, respectively.

DESCRIPTION OF EXEMPLARY EMBODIMENTS

Figure 1A:
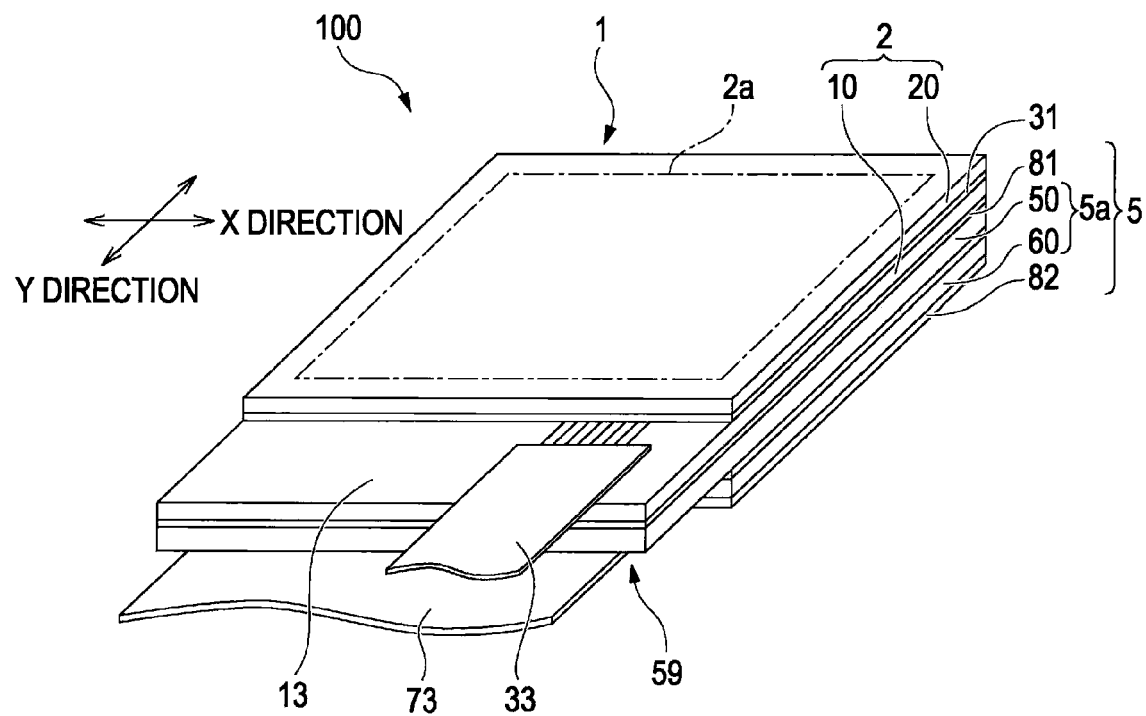
FIGS. 1A and 1B are an explanation view schematically showing the whole configuration of a display device with an input function according to the invention and an explanation view schematically showing the cross-sectional configuration, respectively.

The embodiments of the invention will be described with reference to the accompanying drawings. In each view used for following description, the scale of each layer or each member is differentiated from each other in order that each layer or each member has a size capable of being identified in the drawing.

Embodiment 1

Whole Configuration

Figure 1B:
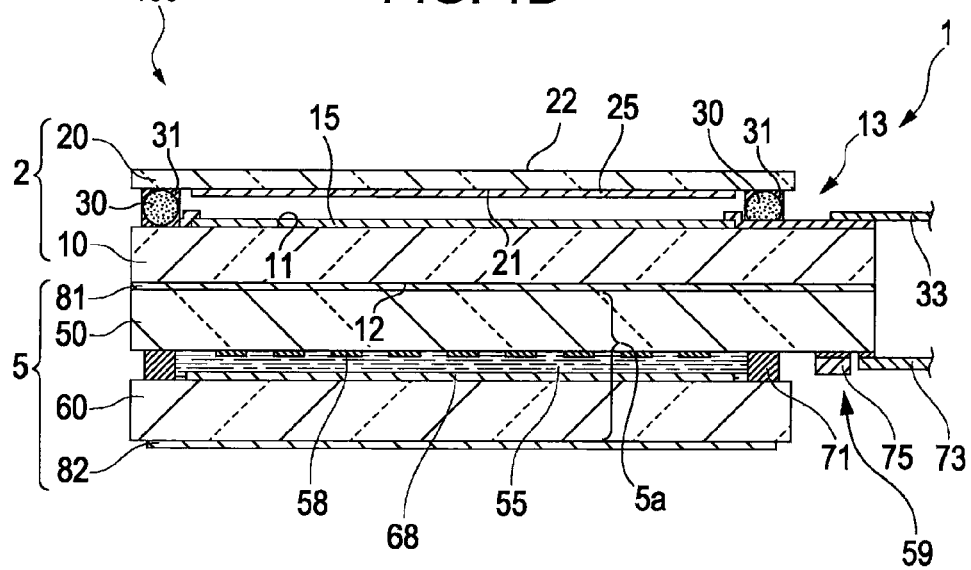

FIGS. 1A and 1B are an explanation view schematically showing the whole configuration of a display device with an input function according to the invention and an explanation view schematically showing the cross-sectional configuration, respectively. In addition, in FIG. 1B, the number of electrodes of an input device, pixel electrodes or counter electrodes of a liquid crystal device or the like is reduced.

In FIGS. 1A and 1B, the display device 100 with the input function according to the present embodiment includes a liquid crystal device 5 as an image generating device and an input device 1 which is arranged so as to be overlapped on a surface, which emits display light, of this liquid crystal device 5.

The liquid crystal device 5 includes a transmissive type, reflective type, or a transflective type active matrix liquid crystal panel 5a. In the present embodiment, since the liquid crystal panel 5a is of the transmissive type, a backlight device (not shown) is arranged on a side opposite to a light-emitting side of the display light. In the liquid crystal device 5, a first polarization plate 81 is arranged so as to be overlapped on the liquid crystal panel 5a at the light-emitting side of the display light, and a second polarization plate 82 is arranged so as to be overlapped on a side opposite thereto. The liquid crystal panel 5a includes a light transmission device substrate 50 arranged at the light-emitting side of the display light and a light transmission counter substrate 60 which is arranged to face this device substrate 50. The counter substrate 60 and the device substrate 50 are adhered to each other by a frame-shaped seal material 71, and a liquid crystal layer 55 is held in a region surrounded by the seal material 71 between the counter substrate 60 and the device substrate 50.

A plurality of pixel electrodes 58 is formed on the surface of the device substrate 50 which faces the counter substrate 60, and a common electrode 68 is formed on the surface of the counter substrate 60 which faces the device substrate 50. In the case where a color display is performed in the liquid crystal device 5, color filters (not shown) are formed on the counter substrate 60. In addition, the common electrode 68 may be formed on the device substrate 50. In addition, the counter substrate 60 may be arranged at the light-emitting side of the display light. In the device substrate 50, a driving IC 75 is COG-mounted in an extension region 59 extending from the edge of the counter substrate 60, and a flexible substrate 73 is connected in the extension region 59. In the device substrate 50, a driving circuit may be formed simultaneously with a switching element on the device substrate 50.

Detailed Configuration of Input Device 1

FIGS. 2A, 2B and 2C are an explanation view schematically showing the planar layout of an electrode formed on a resistance film type input panel of an input device according to Embodiment 1 of the invention, an explanation view schematically showing the planar configuration of an electrode formed on a first light transmission substrate of this resistance film type input panel, and an explanation view schematically showing the planar configuration of an electrode formed on a second light transmission substrate of the resistance film type input panel, respectively. In addition, in FIG. 2A, band-shaped electrodes formed on the first light transmission substrate are denoted by a solid line and band-shaped electrodes formed on the second light transmission substrate are denoted by a dotted line. In FIGS. 2B and 2C, the formation range of a planar electrode formed on an insulating substrate is denoted by a dashed dotted line. In the following embodiments, the intersection directions (perpendicular directions, in the present embodiment) of the first light transmission substrate and the second light transmission substrate used in the resistance film type input panel on the substrate surface are described as an X direction and a Y direction, respectively.

The input device 1 of the present embodiment is a resistance film type input device including the resistance film type input panel 2 arranged so as to be overlapped on the liquid crystal device 5, and a central region of the resistance film type input panel 2 is used as an input region 2a. Such a resistance film type input panel 2 includes the first light transmission substrate 10 formed of a glass plate, a plastic plate or the like and the second light transmission substrate 20 formed of a glass plate, a plastic plate, a plastic sheet or the like. In the present embodiment, the first light transmission substrate 10 and the second light transmission substrate 20 are formed of an alkali glass plate. The first light transmission substrate 10 and the second light transmission substrate 20 are adhered by a frame-shaped seal material 31 such that the first surfaces 11 and 21 thereof face each other with a predetermined gap interposed therebetween. The second light transmission substrate 20 is arranged at an input operation side and the first light transmission substrate 10 is arranged at the side of the liquid crystal device 5. Accordingly, the second light transmission substrate 20 is arranged such that the second surface 22 thereof faces the input operation side, and the first light transmission substrate 10 is arranged such that the second surface 12 thereof faces the side of the liquid crystal device 5. In the resistance film type input panel 2 having the above-described configuration, since the second light transmission substrate 20 needs to be flexed when an input is performed, the second light transmission substrate 20 has a thickness smaller than that of the first light transmission substrate 10 and has a flexibility.

Here, both the first light transmission substrate 10 and the second light transmission substrate 20 are a rectangular shape in which substrate sides 10x1, 10x2, 20x1 and 20x2 extending in the X direction are long sides and substrate sides 10y1, 10y2, 20y1 and 20y2 extending in the Y direction are short sides, and an aspect ratio of the first light transmission substrate 10 and the second light transmission substrate 20 is, for example, 4:1.

In the first surface 11 of the first light transmission substrate 10, a flexible substrate 33 is connected in an extension region 13 extending from the edge of the second light transmission substrate 20 in the Y direction. Such a flexible substrate 33 is a wiring member for electrically connecting the resistance film type input panel 2 and an input position detecting circuit (not shown).

In the resistance film type input panel 2, a first light transmission planar electrode 15 formed of an indium tin oxide (ITO) film is formed over the whole of the input region 2a of the first surface 11 of the first light transmission substrate 10, a second light transmission planar electrode 25 formed of an ITO film is formed over the whole of the input region 2a of the first surface 21 of the second light transmission substrate 20, and the inside thereof is an air layer.

In addition, on the first surface 11 of the first light transmission substrate 10, a pair of first band-shaped electrodes 16a and 16b (first band-shaped electrode pair) electrically connected over the entire X direction with respect to both ends which face each other in the Y direction of the first planar electrode 15 is formed, and the first band-shaped electrodes 16a and 16b are formed at the outer circumferential side of the input region 2a. In the present embodiment, the first band-shaped electrodes 16a and 16b are metal electrodes laminated on both ends, which face each other in the Y direction of the first planar electrode 15, and are formed of silver or a silver alloy. Accordingly, while the sheet resistance of the first band-shaped electrodes 16a and 16b is 0.2Ω/, the sheet resistance of the first planar electrode 15 is 500Ω/. The sheet resistance of the first band-shaped electrodes 16a and 16b is lower than that of the first planar electrode 15.

On a corner of the first light transmission substrate 10, four terminals 16e, 16f, 16g and 16h are formed, and, of the pair of first band-shaped electrodes 16a and 16b, one first band-shaped electrode 16a extends from one end of the terminal 16g in parallel to the substrate side 10y1 located at one side of the Y direction. A relay electrode 16s extends from the terminal 16e along the substrate side 10x1 located at one side of the X direction, and the other first band-shaped electrode 16b extends from the front end of the relay electrode 16s along the substrate side 10y2 located at the other side of the Y direction.

In addition, on the first surface 21 of the second light transmission substrate 20, a pair of second band-shaped electrodes 26a and 26b (second band-shaped electrode pair) electrically connected over the entire Y direction with respect to both ends which face each other in the X direction of the second planar electrode 25 is formed, and the second band-shaped electrodes 26a and 26b are formed at the outer circumferential side of the input region 2a, similar to the first band-shaped electrodes 16a and 16b. In the present embodiment, the second band-shaped electrodes 26a and 26b are metal electrodes laminated on both ends which face each other in the X direction of the second planar electrode 25, and are formed of silver or a silver alloy, similar to the first band-shaped electrodes 16a and 16b. Accordingly, the sheet resistance of the second band-shaped electrodes 26a and 26b is lower than that of the second planar electrode 25. On the end of the second light transmission substrate 20, two terminals 26f and 26h are formed and, of the pair of second band-shaped electrodes 26a and 26b, one second band-shaped electrode 26a extends from one end of the terminal 26f along the substrate side 20x1 located at one side of the X direction. In addition, a relay electrode 26s extends from the terminal 26h along the substrate side 20y1 located at one side of the Y direction, and the other second band-shaped electrode 26b extends from the front end of the relay electrode 26s along the substrate side 20x2 located at the other side of the X direction. In addition, on one of the first light transmission substrate 10 and the second light transmission substrate 20, small protrusions for defining the separation distance between the first light transmission substrate 10 and the second light transmission substrate 20 may be formed as a spacer.

When the second light transmission substrate 20 is arranged to face the first light transmission substrate 10 having the above-described configuration, the terminals 26f and 26h formed on the second light transmission substrate 20 overlap with the terminals 16f and 16h formed on the first light transmission substrate 10. In the first surface 11 of the first light transmission substrate 10, a flexible substrate 33 (see FIG. 1) is connected to the end of the other side located on the extension region 13 of the terminals 16e, 16f, 16g and 16h. In the seal material 31 shown in FIG. 1B, an inter-substrate conducting material 30 formed of plastic beads, in which a metal layer is formed on the surface thereof, or the like is mixed, and the inter-substrate conducting material 30 is formed between the first surface 11 of the first light transmission substrate 10 and the first surface 21 of the second light transmission substrate 20 and conductively connects the terminals 26f and 26h formed on the second light transmission substrate 20 and the terminals 16f and 16h formed on the first light transmission substrate 10.

Accordingly, the first band-shaped electrode 16a is electrically connected to the input position detecting circuit via the terminal 16g and the flexible substrate 33. Therefore, one end 16a1 of the first band-shaped electrode 16a close to an electrical connection position to the input position detecting circuit is a connection portion between the first band-shaped electrode 16a and the terminal 16g. In contrast, the first band-shaped electrode 16b is electrically connected to the input position detecting circuit via the relay electrode 16s, the terminal 16e and the flexible substrate 33. Therefore, one end 16b1 of the first band-shaped electrode 16b close to the electrical connection position to the input position detecting circuit is a connection portion between the first band-shaped electrode 16b and the relay electrode 16s.

Meanwhile, the second band-shaped electrode 26a is electrically connected to the input position detecting circuit via the terminal 26f, the terminal 16f and the flexible substrate 33. Therefore, one end 26a1 of the second band-shaped electrode 26a close to the electrical connection position to the input position detecting circuit is a connection portion between the second band-shaped electrode 26a and the terminal 26f. In contrast, the second band-shaped electrode 26b is electrically connected to the input position detecting circuit via the relay electrode 26s, the terminal 26h, the terminal 16h and the flexible substrate 33. Therefore, one end 26b1 of the second band-shaped electrode 26b close to the electrical connection position to the input position detecting circuit is a connection portion between the second band-shaped electrode 26b and the relay electrode 26s.

Detailed Configuration of Planar Electrode

Figure 3A:
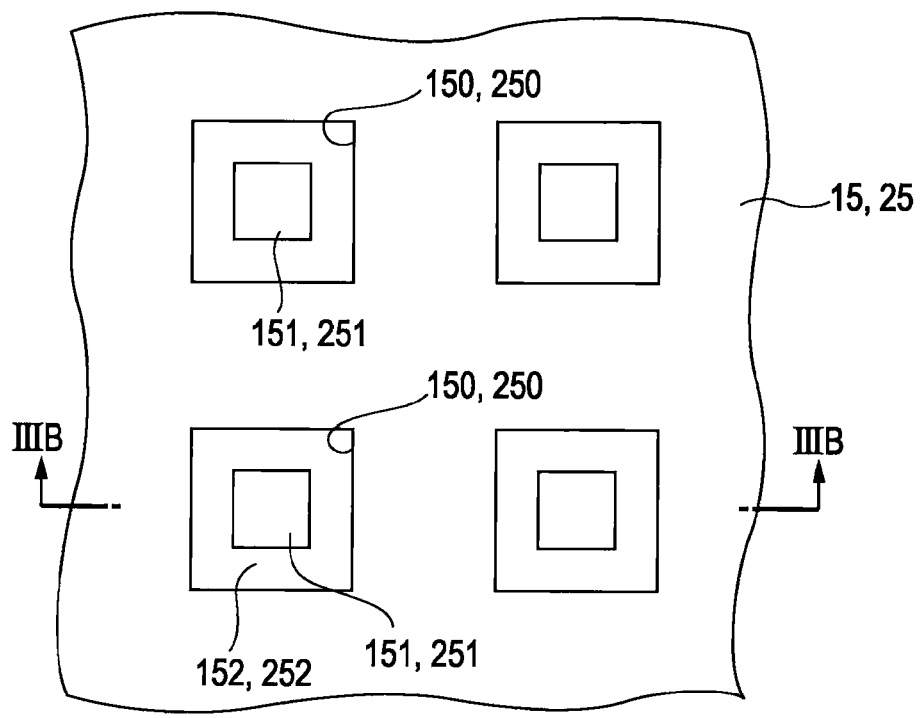
FIGS. 3A and 3B are an explanation view showing the planar shape of an opening formed in the planar electrode of the resistance film type input panel according to Embodiment 1 of the invention and an explanation view schematically showing the cross-sectional configuration when the resistance film type input panel is cut at a position corresponding to a line IIIB-IIIB, respectively.
Figure 3B:
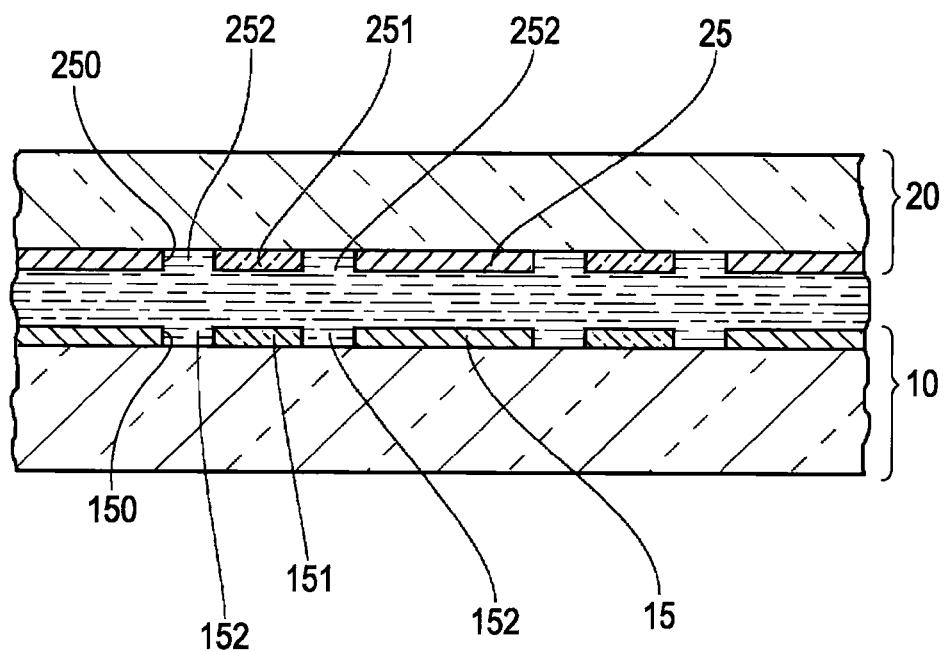

FIGS. 3A and 3B are an explanation view showing the planar shape of an opening formed in the planar electrode of the resistance film type input panel according to Embodiment 1 of the invention and an explanation view schematically showing the cross-sectional configuration when the resistance film type input panel is cut at a position corresponding to a line IIIB-IIIB, respectively.

In the input device 1 of the present embodiment, a plurality of openings 150 is formed in the first planar electrode 15 of the first light transmission substrate 10, and a plurality of openings 250 is formed in the second planar electrode 25 of the second light transmission substrate 20, similar to the first planar electrode 15. Accordingly, the sheet resistance of the first planar electrode 15 and the second planar electrode 25 is high, because the openings 150 and 250 are formed.

In the present embodiment, as shown in FIGS. 3A and 3B, an island pattern 151 having a rectangular shape is formed at the inside of the opening 150 formed in the first light transmission substrate 10 so as to be separated from the inner circumference of the opening 150 with a gap 152 interposed therebetween. The island pattern 151 is formed of an ITO film (light transmission conductive film) which is simultaneously formed with the first planar electrode 15, and has the same refractive index as the first planar electrode 15. In the present embodiment, the opening 150 has a square shape of which the length of one side is 50 μm to 200 μm, and a ratio of the size of the opening 150 to the size of the island pattern 151 is preferably set to 2:1 or more and more preferably 3:1 or more. The island pattern 151 and the inner circumference of the opening 150 are separated from each other with the gap 152 having a width of 5 μm to 30 μm interposed therebetween.

Even in the second light transmission substrate 20, similar to the first light transmission substrate 10, an island pattern 251 having a rectangular shape is formed at the inside of the opening 250 so as to be separated from the inner circumference of the opening 250 with a gap 252 interposed therebetween. The island pattern 251 is formed of an ITO film (light transmission conductive film) which is simultaneously formed with the second planar electrode 25. In the present embodiment, the opening 250 has a square shape of which the length of one side is 50 μm to 200 μm, and a ratio of the size of the opening 250 to the size of the island pattern 251 is preferably set to 2:1 or more and more preferably 3:1 or more. The island pattern 251 and the inner circumference of the opening 250 are separated from each other with the gap 252 having a width of 5 μm to 30 μm interposed therebetween.

The openings 150 and the openings 250 having the above-described configuration are formed to be overlapped in plan view, with the same shape or dimension.

Operation and Main Effect of Present Embodiment

Figure 4A:
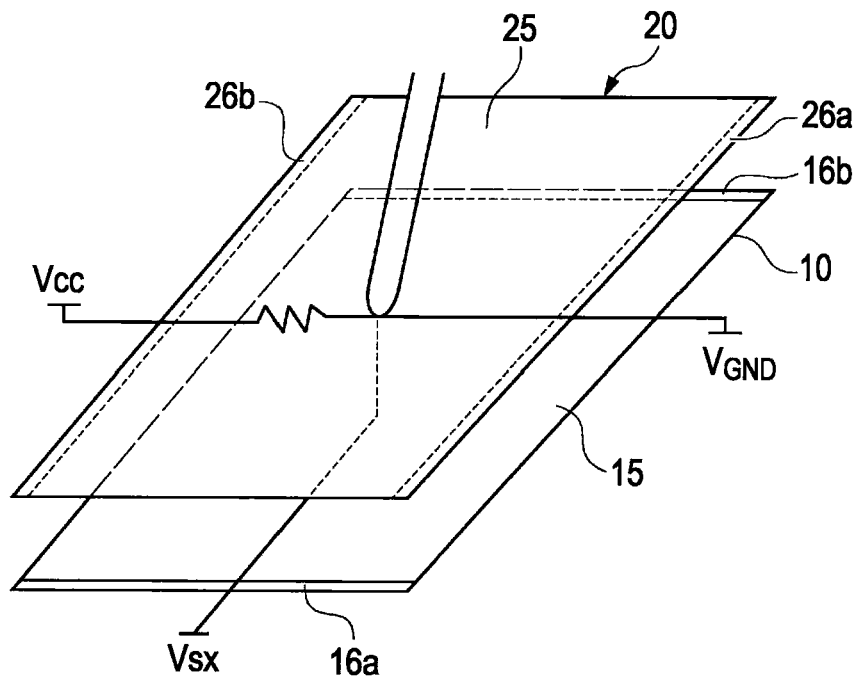
FIGS. 4A and 4B are an explanation view explaining the principle of detecting a touch position in an X direction in the resistance film type input device according to the invention and an explanation view explaining the principle of detecting a touch position in a Y direction, respectively.
Figure 4B:
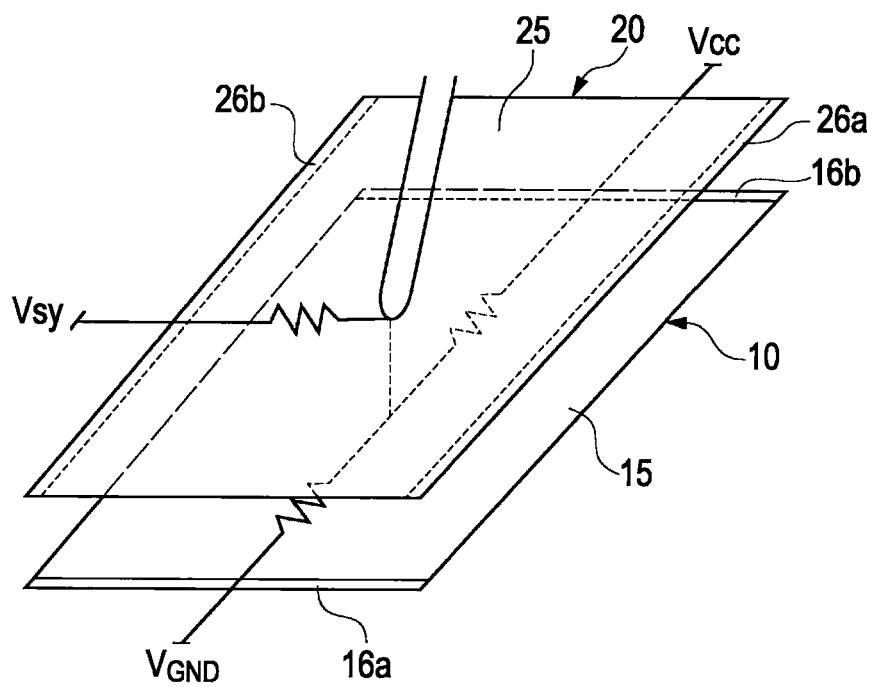

FIGS. 4A and 4B are an explanation view explaining the principle of detecting a touch position in an X direction in the resistance film type input device according to the invention and an explanation view explaining the principle of detecting a touch position in a Y direction, respectively. In the resistance film type input device 1 of the present embodiment, as shown in FIG. 4A, when a voltage of the X direction is applied from the input position detecting circuit to the second planer electrode 25 via the second band-shaped electrodes 26a and 26b and the input position detecting circuit detects a voltage Vsx via the first light transmission substrate 10, the touch position of the X direction can be detected. As shown in FIG. 4B, when a voltage of the Y direction is applied from the input position detecting circuit to the first planer electrode 15 via the first band-shaped electrodes 16a and 16b and the input position detecting circuit detects a voltage Vsy via the second light transmission substrate 20, the touch position of the Y direction can be detected.

In the first band-shaped electrodes 16a and 16b and the second band-shaped electrodes 26a and 26b described with reference to FIG. 2, since the resistance is accumulated from one ends 16a1, 16b1, 26a1 and 26b1 to the other ends 16a2, 16b2, 26a2 and 26b2, in the first band-shaped electrodes 16a and 16b and the second band-shaped electrodes 26a and 26b, the resistance up to the other ends 16a2, 16b2, 26a2 and 26b2 is larger than the resistance up to one ends 16a1, 16b1, 26a1 and 26b1. Accordingly, by the voltage drop of the first band-shaped electrodes 16a and 16b and the second band-shaped electrodes 26a and 26b, a potential difference is generated between one ends 16a1 and 16b1 and the other ends 16a2 and 16b2 and between one ends 26a1 and 26b1 and the other ends 26a2 and 26b2. Such a potential difference becomes more serious when the outer circumferential region of the input region 2a narrows and the widths of the first band-shaped electrodes 16a and 16b and the second band-shaped electrodes 26a and 26b are decreased.

In the present embodiment, since the openings 150 and 250 are formed in the first planar electrode 15 and the second planar electrode 25, even when the thickness of the ITO film configuring the first planar electrode 15 and the second planar electrode 25 is not small, the resistance values of the first planar electrode 15 and the second planar electrode 25 are high. Accordingly, even when the widths of the first band-shaped electrodes 16a and 16b and the second band-shaped electrodes 26a and 26b are decreased, the resistance values of the first planar electrode 15 and the second planar electrode 25 are sufficiently higher than those of the first band-shaped electrodes 16a and 16b and the second band-shaped electrodes 26a and 26b. Accordingly, a difference in the resistance of the first band-shaped electrodes 16a and 16b and the second band-shaped electrodes 26a and 26b according to the positions is absorbed by the resistance of the first planar electrode 15 and the second planar electrode 25. Accordingly, since a uniform electric field can be generated between the first band-shaped electrodes 16a and 16b and between the second band-shaped electrodes 26a and 26b, disturbance does not occur in an equipotential line formed between the first band-shaped electrodes 16a and 16b. Therefore, since linearity between the electrical signal which can be obtained from the input position detecting circuit and the touch position is high, it is possible to improve the detection accuracy of the input device 1.

If the size of the openings 150 and 250 is less than 50 μm, it is possible to efficiently increase the resistance of the first band-shaped electrodes 16a and 16b and the second band-shaped electrodes 26a and 26b. In contrast, if the size of the openings 150 and 250 is more than 200 μm, the region which cannot detect the input position is increased and thus sensitivity deteriorates. In the present embodiment, since the size of the openings 150 and 250 is set in a range from 50 μm to 200 μm, even when the openings 150 and 250 are formed in the first band-shaped electrodes 16a and 16b and the second band-shaped electrodes 26a and 26b so as to increase the resistance, the sensitivity of the input device 1 does not deteriorate.

Since the island patterns 151 and 251 having the same refractive index as the first planar electrode 15 and the second planar electrode 25 are formed at the inside of the openings 150 and 250 of the first planar electrode 15 and the second planar electrode 25 so as to be separated from the inner circumferences of the openings 150 and 250 with the predetermined gaps 152 and 252 interposed therebetween, the existence of the openings 150 and 250 is inconspicuous. Accordingly, the quality of the input device 1 is high, and, even when the display device 100 with the input function is configured by arranging the liquid crystal device 5 on the rear surface of the input device 1, the existence of the openings 150 and 250 is inconspicuous. Accordingly, it is possible to view the image generated by the liquid crystal device 5 with high quality.

If the width of the gaps 152 and 252 exceeds 30 μm, the existence of the gaps 152 and 252 is conspicuous according to other conditions. However, in the present embodiment, since the width of the gaps 152 and 252 is set to 30 μm or less, the existence of the gaps 152 and 252 is inconspicuous. If the width of the gaps 152 and 252 is less than 5 μm, the pixel pitch of the liquid crystal device 5 (image generating device) and the width of the gaps 152 and 252 become a close value, and, as a result, interference fringes may occur although the existence of the gaps 152 and 252 is inconspicuous. However, in the present embodiment, since the width of the gaps 152 and 252 is set to 5 μm or more, the interference fringes with the liquid crystal device 5 do not occur. In addition, an unintended short-circuit occurs between the island patterns 151 and 251 and the openings 150 and 250 and the possibility that the resistance value is changed in a partial region of the first planar electrode 15 or the second planar electrode 25 is unpreferably increased. When the island patterns 151 and 251 are separated from the inner circumferences of the openings 150 and 250 with the gaps 152 and 252 interposed therebetween, the resistance values of the first planar electrode 15 and the second planar electrode 25 which are increased by the openings 150 and 250 are not decreased by the island pattern 151 and 251. If the openings 150 and 250 have such island patterns 151 and 251, although the opening 150 and 250 are enlarged for the purpose of further increasing the sheet resistance values of the first planar electrode 15 and the second planar electrode 25, the problem that the existence of the openings 150 and 250 is conspicuous does not occur.

In the second light transmission substrate 20 arranged at the input operation side, when the input operation is performed, since the second planar electrode 25 is flexed, large stress is apt to be applied to the second planar electrode 25. However, when the openings 250 are formed, since the second planar electrode 25 formed of the ITO film are apt to be flexed, large stress is not generated in the second planar electrode 25 and the second planar electrode 25 can be prevented from being damaged.

In addition, since the formation positions of the openings 150 and 250 of the first planar electrode 15 and the second planar electrode 25 overlap each other in plan view, the sensitivity of the input device 1 can be increased. That is, the positions where the openings 150 and 250 are formed cannot be used for the detection of the input position, but, if the openings 150 formed in the first planar electrode 15 and the openings 250 formed in the second planar electrode 25 overlap each other in plan view, the area of the portions which cannot be used for detection of the input position by the existence of the openings 150 and 250 can be decreased.

Although the cheap alkali glass substrate is used as the first light transmission substrate 10 and the second light transmission substrate 20 in the present embodiment, it is possible to prevent spots from being generated. That is, when an exposed portion of the alkali glass substrate is large, spots are apt to be generated due to soaking of a sodium component. However, in the present embodiment, since the island patterns 151 and 251 are formed at the inside of the openings 150 and 250, the exposed portion of the alkali glass substrate is small. Therefore, it is possible to prevent spots from being generated due to soaking of the sodium component from the alkali glass substrate and make the spots inconspicuous even when the spot are generated.

Embodiment 2

Figure 5A:
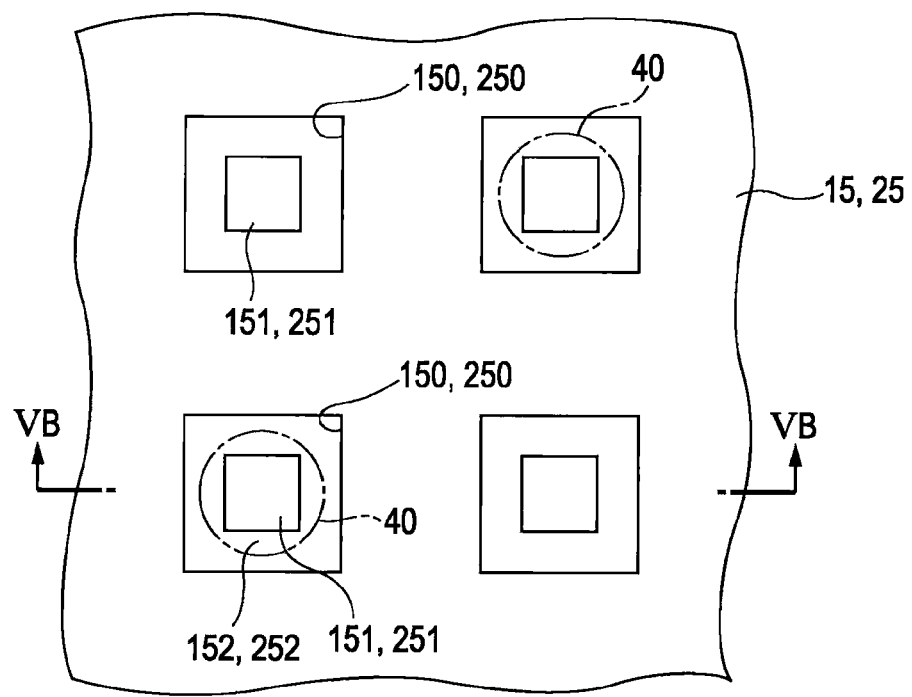
FIGS. 5A and 5B are an explanation view showing the planar shape of an opening formed in a planar electrode of a resistance film type input panel of an input device according to Embodiment 2 of the invention and an explanation view schematically showing the cross-sectional configuration when the resistance film type input panel is cut at a position corresponding to a line VB-VB, respectively.
Figure 5B:
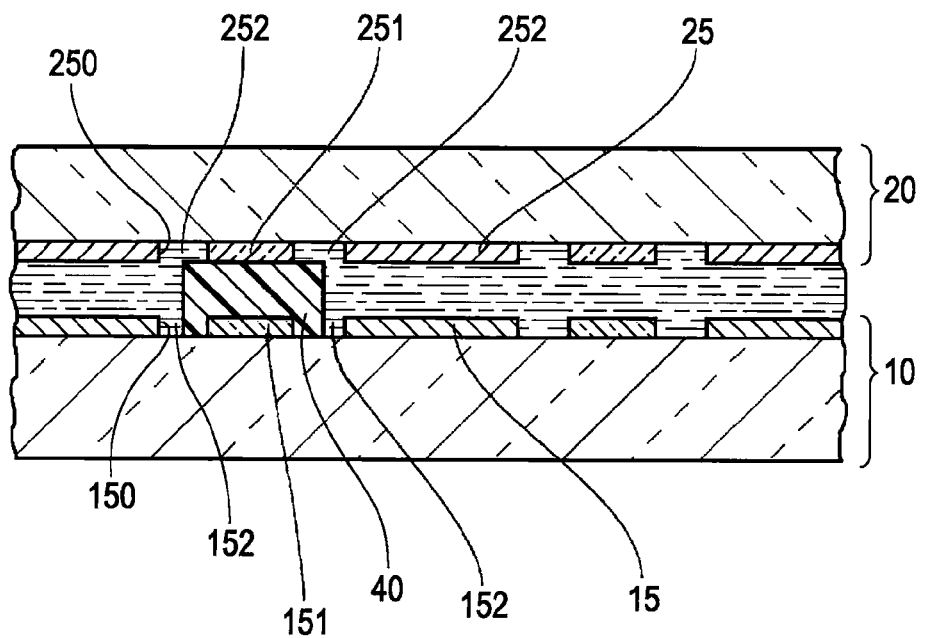

FIGS. 5A and 5B are an explanation view showing the planar shape of an opening formed in a planar electrode of a resistance film type input panel of an input device according to Embodiment 2 of the invention and an explanation view schematically showing the cross-sectional configuration when the resistance film type input panel is cut at a position corresponding to a line VB-VB, respectively. Since the basic configuration of the present embodiment is similar to that of Embodiment 1, the common portions are denoted by the same reference numerals and the description thereof will be omitted.

As shown in FIGS. 5A and 5B, even in the input device 1 of the present embodiment, in the resistance film type input panel 2, since the openings 150 and 250 are respectively formed in the first band-shaped electrodes 16a and 16b and the second band-shaped electrodes 26a and 26b, the sheet resistance of the first planar electrode 15 and the second planar electrode 25 is high. Accordingly, the difference in resistance of the first band-shaped electrodes 16a and 16b and the second band-shaped electrodes 26a and 26b according to the positions thereof can be absorbed by the resistance of the first planar electrode 15 and the second planar electrode 25. In addition, since the island patterns 151 and 251 having the same refractive index as the first planar electrode 15 and the second planar electrode 25 are formed, the existence of the openings 150 and 250 is inconspicuous. Therefore, since linearity between the electrical signal which can be obtained from the input position detecting circuit and the touch position is high, the detection accuracy of the input device 1 can be improved and the image generated by the liquid crystal device 5 can be viewed with high quality. That is, the same effects as Embodiment 1 can be obtained.

Since the formation positions of the openings 150 and 250 of the first planar electrode 15 and the second planar electrode 25 overlap each other in plan view similar to Embodiment, the area of the portions which cannot be used for detecting the input position due to the existence of the openings 150 and 250 can be decreased.

In the present embodiment, a spacer 40 is arranged between the first light transmission substrate 10 and the second light transmission substrate 20 for the purpose of the control of the substrate interval between the first light transmission substrate 10 and the second light transmission substrate 20, and the spacer 40 is formed at a position which overlaps with a portion of the opening 150 of the first light transmission substrate 10 in plan view. Accordingly, the spacer 40 also overlaps with the opening 250 formed in the second planar electrode 25.

The spacer 40 is a protrusion formed of resin, which is obtained by forming the first planar electrode 15 on the first light transmission substrate 10, coating photosensitive resin on the surface thereof, and exposing and developing the photosensitive resin. The spacer 40 covers from the formation region of the island pattern 151 to the gap 152.

Since the other configuration is similar to that of Embodiment 1, the description thereof will be omitted. In the present embodiment, since the spacer 40 is formed at the position where the openings 150 and 250 overlap each other in plan view and is formed at the inside of the openings 150 and 250, it is possible to increase the sensitivity of the input device 1. That is, although the positions where the openings 150 and 250 are formed and the position where the spacer 40 is formed cannot be used for detecting of the input position, the openings 150 formed in the first planar electrode 150, the openings 250 formed in the second planar electrode 25, and the spacer 40 overlap one another in plan view, the area of the portions which cannot be used for detecting the input position due to the existence of the openings 150 and 250 and the spacer 40 can be decreased.

Since the spacer 40 covers from the formation region of the island pattern 151 to the gap 152 and a portion thereof is directly in contact with the first insulating substrate 10, adhesion strength is high. That is, if the spacer 40 is in contact only with the first planar electrode 15 formed of the ITO film when the spacer 40 is formed of resin, a problem such as peeling is apt to occur. However, in the present embodiment, since the portion of the spacer 40 is directly in contact with the first insulating substrate 10, adhesion strength is high. Therefore, even when stress is applied to the spacer 40 in every input operation, the spacer 40 is not damaged and thus the reliability of the resistance film type input device 1 can be improved.

Embodiment 3

Although the openings 150 and 250 and the island patterns 151 and 251 are respectively formed in the first planar electrode 15 and the second planar electrode 25 in Embodiments 1 and 2, the openings and the island patterns may be formed only in one of the first planar electrode 15 and the second planar electrode 25. In this case, of the first planar electrode 15 and the second planar electrode 25, the openings 250 and the island patterns 251 are preferably formed in the second planar electrode 25 located at the input operation side. By this configuration, since the second planar electrode 25 is flexed when the input operation is performed and the second planar electrode 25 is apt to be flexed if the openings 250 are formed, large stress is not generated in the second planar electrode 25 and thus the second planar electrode 25 can be prevented from being damaged.

Embodiment 4

Although the island patterns 151 and 251 are completely separated from the first planar electrode 15 and the second planar electrode 25 by the gaps 152 and 252 in Embodiments 1 and 2, a structure in which the island patterns 151 and 251 are partially linked with the first planar electrode 15 and the second planar electrode 25 may be employed. Even in such a configuration, if the gaps 152 and 252 are present, the effect that the resistance of the first planar electrode 15 and the second planar electrode 25 is increased by the openings 150 and 250 are not damaged by the formation of the island patterns 151 and 251. However, in this case, link regions are arranged to be biased toward a partial region of the first planar electrode 15 and the second planar electrode 25, the resistance values of the partial regions of the first planar electrode 15 and the second planar electrode 25 may be unpreferably changed. Accordingly, it is preferable that the link regions are arranged in the first planar electrode 15 and the second planar electrode 25 with uniform density. Accordingly, it is possible to prevent the resistance values from being changed in the partial regions of the first planar electrode 15 and the second planar electrode 25.

Embodiment 5

Although, when the island patterns 151 and 251 having the same refractive index as the first planar electrode 15 and the second planar electrode 25 are formed, the first planar electrode 15 and the second planar electrode 25, and the island patterns 151 and 251 are formed of the same light transmission conductive film in Embodiments 1 to 4, if the refractive index is identical, the first planar electrode 15 and the second planar electrode 25, and the island patterns 151 and 251 may be formed of different light transmission films.

Other Embodiments

Although the liquid crystal device 5 is used as the image generating device in the above-described embodiments, an organic electroluminescence device or a plasma display device may be used as the image generating device.

Example of Mounting in Electronic Apparatus

Figure 6A:
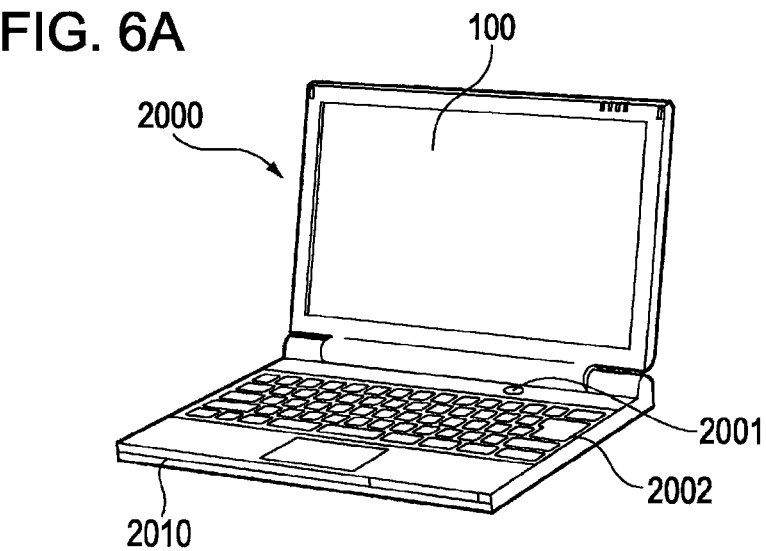
FIG. 6 is an explanation view showing an electronic apparatus using the display device with the input function according to the invention.
Figure 6B:
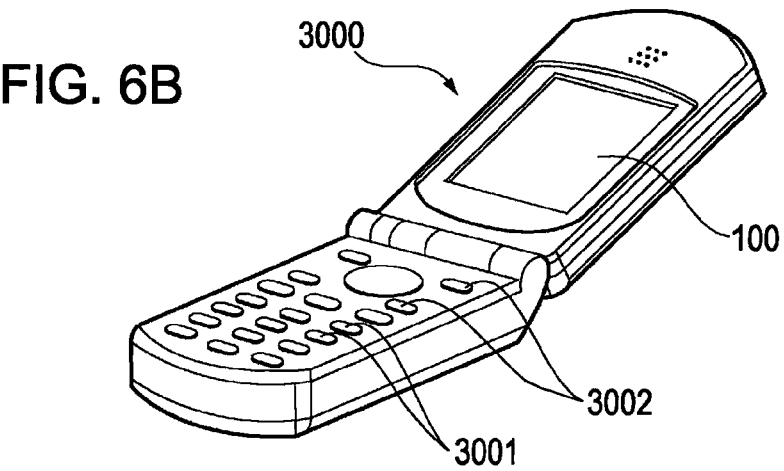
Figure 6C:
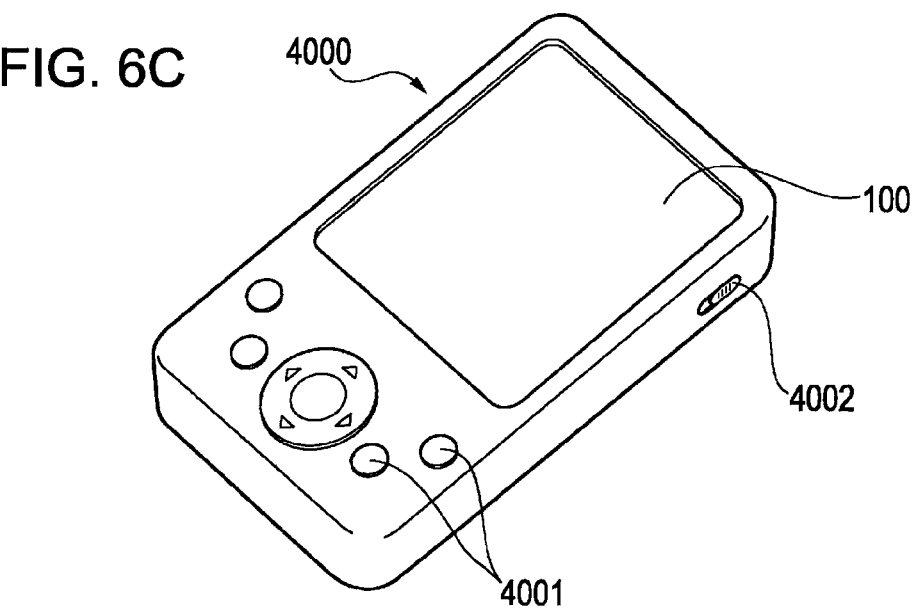

Next, an electronic apparatus to which the display device 100 with the input function according to the above-described embodiments is applied will be described. FIG. 6A shows the configuration of a mobile personal computer including the display device 100 with the input function. The personal computer 2000 includes the display device 100 with the input function as a display unit and a main body 2010. In the main body 2010, a power switch 2001 and a keyboard 2002 are provided. FIG. 6B shows the configuration of a mobile telephone including the display device 100 with the input function. The mobile telephone 3000 includes a plurality of operation buttons 3001, a scroll button 3002 and the display device 100 with the input function as a display unit. By operating the scroll button 3002, the screen displayed by the display device 100 with the input function is scrolled. FIG. 6C shows the configuration of a personal digital assistant (PDA) to which the display device 100 with the input function is applied. The PDA 4000 includes a plurality of operation buttons 4001, a power switch 4002, and the display device 100 with the input function as a display unit. When the power switch 4002 is operated, a variety of information including an address book or a schedule book is displayed on the display device 100 with the input function.

As the electronic apparatus to which the display device 100 with the input function is applied, in addition to the electronic apparatuses shown in FIG. 6, there are a digital still camera, a liquid crystal TV set, a viewfinder-type or direct-view monitor type video tape recorder, a car navigation system, a pager, an electronic organizer, an electronic calculator, a word processor, a workstation, a videophone, a POS terminal, and a bank terminal. The above-described display device 100 with the input function is applicable as the display units of various types of electronic apparatuses.

What is claimed is:

1. A resistance film type input device comprising:
   a first light transmission substrate and a second light transmission substrate which face each other;
   a first light transmission planar electrode formed on the surface of the first light transmission substrate, which faces the second light transmission substrate, in an input region, and first band-shaped electrodes electrically connected along both ends which face each other in a first direction of the first planar electrode;
   a second light transmission planar electrode formed on the surface of the second light transmission substrate, which faces the first light transmission substrate, in the input region, and second band-shaped electrodes electrically connected along both ends which face each other in a second direction perpendicular to the first direction; and
   a spacer arranged between the first light transmission substrate and the second light transmission substrate,
   wherein a plurality of openings are formed in each of the first planar electrode and the second planar electrode,
   wherein island patterns formed of the same light transmission conductive film as the planar electrodes are formed at the inside of the openings,
   wherein the formation positions of the openings of the first planar electrode and the second planar electrode overlap with each other in plan view,
   wherein the spacer is arranged at a position which is arranged inside of the openings and overlaps with the island patterns and the openings in plan view, and
   wherein the openings and island patterns of the first light transmission planar electrode mirror the openings and island patterns of the second light transmission planar electrode.

2. The resistance film type input device according to claim 1, wherein the island patterns are formed by the same light transmission conductive film as the planar electrodes so as to be separated from the inner circumferences of the openings with a gap interposed therebetween.

3. The resistance film type input device according to claim 1, wherein the openings and the island patterns are formed in at least a planar electrode, which is arranged at an input operation side, of the first planar electrode and the second planar electrode.

4. The resistance film type input device according to claim 1, wherein an insulating substrate, in which the openings and the island patterns are formed, of the first light transmission substrate and the second light transmission substrate is an alkali glass substrate.

5. The resistance film type input device according to claim 1, wherein the size of the openings is 50 μm to 200 μm.

6. The resistance film type input device according to claim 1, wherein the width of the gap is 5 μm to 30 μm.

7. A display device with an input function, the display device comprising the resistance film type input device according to claim 1, wherein an image generating device is arranged so as to be overlapped on the first light transmission substrate at a side opposite to the second light transmission substrate.

8. The resistance film type input device according to claim 1, wherein one island is formed in each opening.

\* \* \* \* \*